United States Patent [19]
Higdon et al.

[11] Patent Number: 6,102,068
[45] Date of Patent: Aug. 15, 2000

[54] SELECTOR VALVE ASSEMBLY

[75] Inventors: William R. Higdon, Pleasanton; Alan D. Loux, Livermore, both of Calif.

[73] Assignee: Hewlett-Packard Company, Palo Alto, Calif.

[21] Appl. No.: 08/936,044

[22] Filed: Sep. 23, 1997

[51] Int. Cl.[7] .................................................. F16K 11/00
[52] U.S. Cl. .......................... 137/341; 137/884; 137/269; 251/367; 251/129.15
[58] Field of Search ................................... 137/884, 343, 137/341, 269, 271; 251/367, 129.15

[56] References Cited

U.S. PATENT DOCUMENTS

| | | |
|---|---|---|
| 3,021,713 | 2/1962 | Wright . |
| 3,386,472 | 6/1968 | Szonntagh . |
| 4,095,864 | 6/1978 | Hardin ..................................... 137/884 |
| 4,607,526 | 8/1986 | Bachenheimer et al. ........... 73/432 PS |
| 4,969,938 | 11/1990 | America ..................................... 55/386 |
| 4,989,637 | 2/1991 | Dittrich ................................... 137/341 |
| 5,069,419 | 12/1991 | Jerman ...................................... 251/11 |
| 5,222,524 | 6/1993 | Sekler et al. ............................. 137/269 |
| 5,271,597 | 12/1993 | Jerman ...................................... 251/11 |
| 5,323,999 | 6/1994 | Bonne et al. .............................. 251/11 |
| 5,462,087 | 10/1995 | Fukano et al. .......................... 137/884 |
| 5,475,318 | 12/1995 | Marcus et al. .......................... 324/762 |
| 5,519,635 | 5/1996 | Miyake et al. .......................... 364/497 |
| 5,529,088 | 6/1996 | Asou ....................................... 251/367 |
| 5,640,995 | 6/1997 | Packard et al. ......................... 137/884 |
| 5,699,834 | 12/1997 | Hayashi et al. ......................... 137/884 |

FOREIGN PATENT DOCUMENTS

| | | |
|---|---|---|
| WO 81/02989 | 10/1981 | WIPO . |
| WO 93/22058 | 11/1993 | WIPO . |
| WO 95/26796 | 10/1995 | WIPO . |
| WO 97/44132 | 11/1997 | WIPO . |

*Primary Examiner*—A. Michael Chambers

[57] ABSTRACT

A selector valve assembly has reduced size, reduced cost, and increased repeatability with improved reliability and reduced maintenance expense due to use of a silicon micromachined valve body held in a releasable housing which in turn is mounted on a manifold plate to which are attached inlet and outlet fluid carrying tubing. The manifold plate includes two metal plates bonded together by an intervening polymer film and defining thread female connection inlets for tube fittings. The micromachined valve body is connected to a pilot valve assembly providing pneumatic operation of the micro-valves in the micromachined valve body. Also, a heater is mounted on the manifold plate to maintain temperature. The micromachined valve body is held on the manifold plate by a releasable spring-loaded assembly allowing quickly replacement of the micro-valve body in case of its failure.

14 Claims, 4 Drawing Sheets

SELECTOR VALVE ASSEMBLY

FIELD OF THE INVENTION

This invention relates generally to micromachined valve assemblies and, more specifically, to a multiport stream selector valve array for use e.g. in gas or liquid analytical instruments, such as for chromatography, or DNA or PCR synthesizers.

DESCRIPTION OF THE PRIOR ART

U.S. Pat. No. 4,474,889, issued Oct. 2, 1984, to Terry et al., describes a gas chromatography valve assembly which has a wafer substrate with grooves and a valve seat formed therein; this disclosure is incorporated by reference herein in its entirety. This valve is used for a miniature gas chromatograph apparatus in which a valve is formed in a semiconductor substrate-type wafer. Thereby the size of gas channels in the substrate wafer is reduced, making miniaturized gas chromatography systems possible.

U.S. Pat. No. 4,869,282, issued Sep. 26, 1989, to Sittler et al., discloses a micromachined miniature valve for gas chromatography. The silicon wafer substrate is bounded to other materials into a layered construction. This is a six-valve assembly wherein component layers of the valve are formed to provide flow channels, valve seats, and ports. The valves incorporate a flexible diaphragm in the form of a flexible organic material such as Kapton. Each of the six valves is formed in a single substrate and has its own actuation port, allowing access by a pneumatic fluid to underline portions of the Kapton diaphragm. Thus a "stop" layer defines six control ports corresponding to associated underline diaphragm sections. These control ports define openings to provide fluid to the individual diaphragm sections for exerting a control force to deflect the diaphragm sections. Beneath each of the ports is a recess that is defined in the surface of the stop layer facing the diaphragm. This disclosure is also incorporated herein by reference in its entirety.

U.S. patent application Ser. No. 08/652,878, filed May 23, 1996, entitled "Housing Assembly for Micromachined Fluid Handling Structure, William R. Higdon et al., also incorporated herein by reference in its entirety, discloses an easily assembled housing for a micromachined valve structure. This modularized quick assembly housing can be disassembled in the field so a new micromachined valve structure can be readily inserted. The assembly includes a central portion which is a conventional micromachined silicon valve body, typically a laminate of several micromachined silicon and/or pyrex layers which is housed in a modularized easily assembled housing including in one embodiment a top plate, a bottom plate, and two side rails for alignment purposes. Thus no encapsulation or other permanent or semi-permanent assembly techniques are used for housing the micromachined body. The assembly is held together by two alignment pins which each penetrate to the top plate, through one of the side rails, and into the bottom plate. That patent application discloses the assembly being mounted on a printed circuit board.

In general, such micromachined valve structures are used to process very small volumes of fluid samples; examples are gas chromatography and other testing and sampling purposes, for instance in a chemical process stream in an oil refinery or other chemical plant, or biotechnology or pharmaceutical plant or laboratory. It is generally recognized that it is desirable to reduce the size and cost of valve assemblies, increase repeatability and reliability, and reduce maintenance expense. Typical prior art valves have various defects, including for instance difficulty in replacing failed parts, difficulty in maintaining temperature of such valve assemblies, and difficulty in quick replacement of a failed valve.

Often such valve assemblies are used in portable applications where the heating must be maintained from a battery power source and hence low power consumption is important.

SUMMARY

In accordance with this invention, a selector valve assembly includes a manifold structure (which may be thermally conductive) and which includes in one embodiment two machined plates (e.g. of metal or high temperature plastic) precisely aligned and bonded together by an intervening polymer film. The lower manifold plate includes threaded female connection inlets for tube fittings that each connect to various tubes carrying streams of fluid samples. The second plate defines a plurality of miniature gas channels formed in its surface to carry the sample gas from the inlets to communicating ports in a micromachined valve assembly which houses the micromachined (e.g. silicon) selector valve body. The polymer layers seals the two plates together and also seals the individual gas channels from the inlet fittings to the valve assembly.

Mounted on a separate portion of the manifold plate is a pilot valve assembly which includes a number of electrically controlled solenoid valves, each connecting via pneumatic tubing to one of the micro-valves in the micromachined valve body. The pilot valves thereby operate the actual fluid micro-valves in the valve body pneumatically. The micromachined valve assembly mounts on the manifold plate and includes a quick disassembly housing, as described above, which clamps the micromachined valve body to the upper manifold plate. This allows the micromachined valve body to be changed if any of its individual valves fails. A heater on the manifold plate controls the temperature of the entire assembly.

The micromachined valve body includes multiple gas sampling valves and outlet port(s) connecting to external devices, for instance a gas analyzer. The micromachined valve body includes in one embodiment a number of corresponding micro-valve actuators that transfer the fluid to the outlet port. In one embodiment, each gas inlet port in the micromachined valve body includes two series-connected micromachined valves which are pneumatically actuated at the same time by the same pilot valve, for a dual sealing capability in case either of the two valves fails. (The typical valve failure mode is to fail open, due to contamination on the valve.)

Advantageously, this selector valve assembly in use enables maintenance of its temperature with low power consumption. It also enables a user to quickly change the micromachined valve body (e.g. in only a few seconds) in the field, without use of tools. Since usually the only part that needs to be changed is the micromachined valve body, this reduces field repair costs.

This selector valve assembly is typically a replacement for e.g. a prior art stream selector valve made of a number of individual machined discrete metal or plastic valve components which are conventionally connected together by threads, etc., resulting in a rather large, heavy, expensive assembly which is difficult to maintain at an even temperature. The present selector valve assembly is especially useful for control of a chemical or biotechnology process where there is a requirement for little or no downtime.

DETAILED DESCRIPTION

Figure 1:
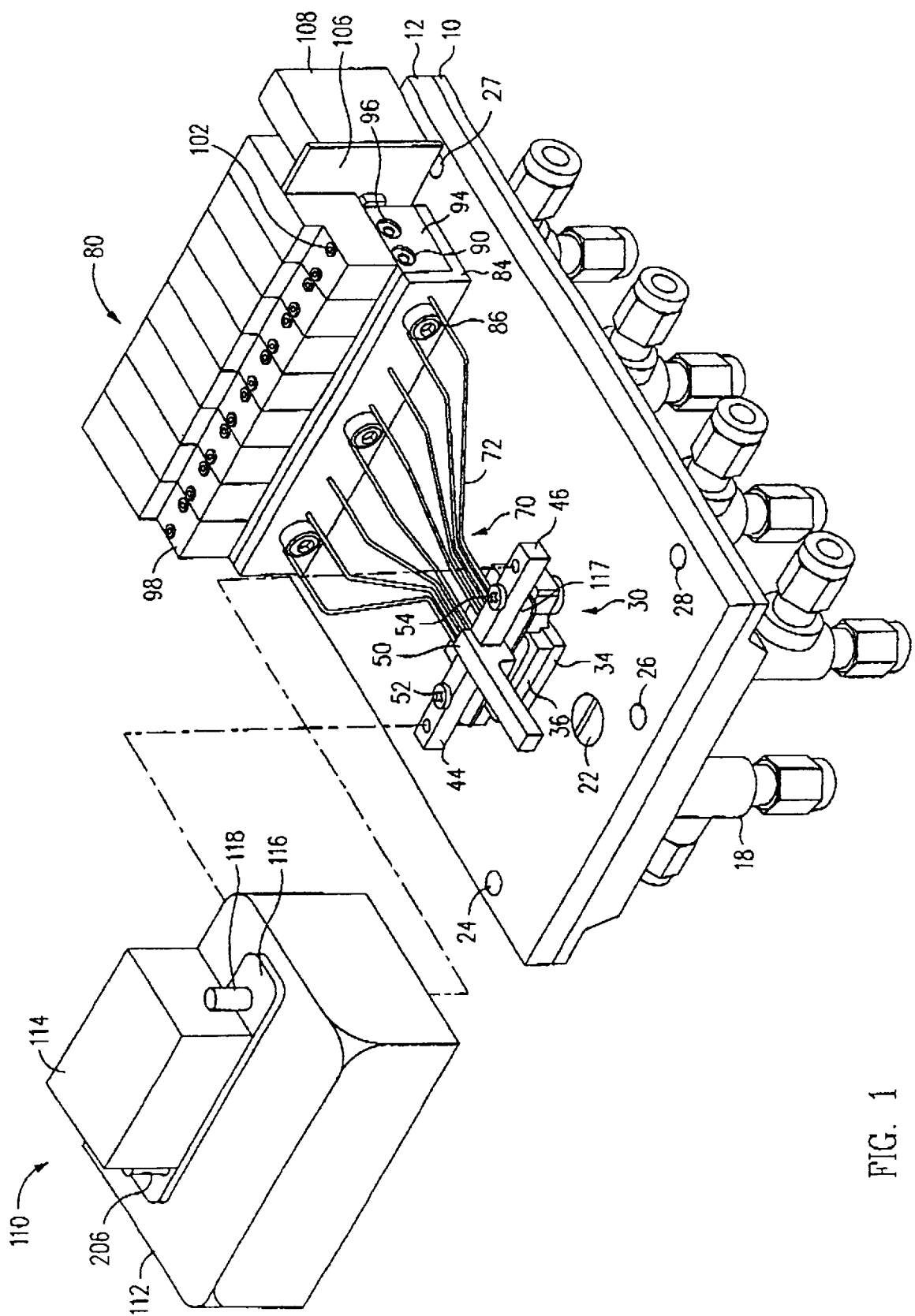
FIG. 1 shows a valve assembly in accordance with this invention in an assembled state.

FIG. 1 shows an assembled view of the present selector valve assembly, except that the cover assembly portion 110 is shown in a partially disassembled (exploded) view, as indicated by the dotted lines. It is to be appreciated that FIG. 1 shows only the selector valve assembly and its associated components; it does not show the rest of the fluid system to which this selector valve assembly connects, for instance a conventional process control system in a factory, or a gas or liquid analytical instrument or other type of apparatus. Typically the other conventional (and not shown) portions of the system provide multiple sources of fluids (gas and/or liquids) and a destination for the fluids from the valve assembly of FIG. 1.

Applications for a selector valve assembly in accordance with this invention are not limited to the disclosed embodiments, but generally include situations where it is necessary to handle fluids in small quantities and direct them or select them, as is done with conventional valve assemblies. Also, it is to be understood that the present invention is not limited by the presently disclosed embodiments, which are merely exemplary, in terms of particular structural elements, valve configurations, materials, size, etc. Further modifications will be apparent to one skilled in the art and are intended to fall within the scope of this invention.

The selector valve assembly of FIG. 1 includes a multilayer, e.g. metal, thermally conductive manifold plate of which two portions are shown, a lower manifold plate 10 and an upper manifold plate 12. As further explained below, a polymer film is captured therebetween (not visible in FIG. 1). Lower manifold plate 10 includes in its underside a number of threaded female connection inlets (not visible in FIG. 1). In a typical application, each of these connection inlets has threaded into it a tube fitting 18, for instance a Swaglok-type fitting, for connection to external tubing for carrying fluids from various sources. The internal structure of lower manifold plate 10 is further described below; it includes a number of through-holes each communicating with one of the fittings 18.

The upper manifold plate 12 defines a number of small diameter fluid carrying channels machined through and into it. The fluids from the fittings 18 pass through the lower manifold plate 10, through the polymer film, and through the upper manifold plate 12. This will be further understood with reference to FIG. 2.

Mounted on the upper plate 12 is a quick release valve assembly 30; for details of an example of such an assembly see the above-referenced patent application "Housing Assembly for Micromachined Fluid Handling Structure". However, valve assembly 30 is not limited to that particular structure. Valve assembly 30 includes an upper plate 36 under which is captured a micromachined valve body 34. Micromachined valve body 34 is generally of conventional structure, being a "sandwich" of pyrex and silicon layers defining pneumatically operated micro-valves formed in the silicon layer by micromachining. The actual micro-valves in one embodiment have e.g. flexible (silicon) diaphragms which are operated by application of pneumatic pressure. Alternatively, these are e.g. Kapton (polymer) diaphragms.

Also included in valve assembly 30 is a two part crossarm 44 and 46 which passes through an opening in a cam-like lever structure 50. Valve assembly 30 is held down to and screwed into the upper manifold plate 12 by screws 52, 54.

Penetrating through the upper manifold plate 12 are several through-holes e.g. 24, 27 and 28 for mounting purposes; a screw penetrates through these holes to attach the manifold assembly to a chassis. (A fourth such hole is not visible.) Screw 22 attaches the upper manifold plate 12 to the lower manifold plate 10 through associated holes. A second such screw (not visible) as located under the pilot valve assembly 80.

Communicating with the micromachined valve body 34 in valve assembly 30 are several small diameter (e.g. stainless steel) tubes collectively identified as 70, of which an example is tube 72. Tubes 70 are typical of the type used in small volume fluid handling systems; a typical internal diameter is 0.01 inches. Each tube 72 penetrates through a bracket 84 which defines a plurality of suitable through-holes to accommodate the tubes 72. Bracket 84 is fastened by (not visible) attachments such as screws to the upper manifold plate 12. Bracket 84 is in turn attached by several screws e.g. 86 to a valve manifold 94. Bracket 84 and valve manifold 94 are parts of the pilot valve assembly 80, which as described above is for valve control purposes, and includes a number of identical individual electrically controlled solenoid valves, of which only solenoid valve 98 is labeled. The fluid carrying passages in manifold 94 (which is e.g. of aluminum) are in communication with each of solenoid valves 98.

Each of solenoid valves 98 is for instance a 12-volt electrically operated solenoid valve, and controls a supply of gas which pneumatically operates the micromachined valves in the micromachined valve body 34. The solenoid valves 98 are each mounted on a PC (printed circuit) board 106 which contains a number of electrical terminals, e.g. two for each valve 98. PC board 106 in turn has mounted on it electrical connector 108. A ribbon cable (not shown) connects to electrical connector 108 and connects in turn to a suitable control apparatus (not shown) such as a computer which provides the electrical signals to control each of solenoid valves 98. Solenoid valves 98 are typically of the type commercially available from Pneutronics, part No. SRS 11-1-PV-12M. Manifold 94 includes through-holes 90 and 96 for respectively supplying and venting the pressurized gas to manifold 94 controlled by solenoid valve 98.

Also shown in FIG. 1 is the cover assembly 110 for covering the valve assembly 30. Cover assembly includes a main cover 112 with a temperature control regulator 114 on top of it for purposes of controlling a heater pad e.g. sheet heater (not shown). A mounting plate 116 is attached by screws 118, 206 to the main cover 112 and attaches to cross arms 44, 46. Screws 118, 206 are e.g. knurled machine screws for finger tightening, without use of a screw driver. Screw 118 extends into the associated hole (see dotted line) in cross arms 44 and 46. Cam slide plate 117 is located between top plate 36 and cross arms 44 and 46. The heater pad (not shown) adhesively attaches to the visible surface of upper manifold plate 12.

The heater pad is thereby in thermal contact with the upper manifold plate 12 to control the temperature of the fluids being transferred through the apparatus of FIG. 1. Typical temperature are from ambient temperature to several hundred degrees Centigrade. The heater pad is powered by e.g. 12 volts DC supplied via connector 108. Typically, the heater pad is an adhesive-backed thin film heater which is easily replaced in the event of a failure. Associated control wires for the heater pad are connected to the temperature control regulator 114.

While these dimensions are not limiting, a typical size of the selector valve assembly of FIG. 1 is approximately 4 inches wide by 6 inches long by 1½ inches high. Advantageously, this apparatus has a relatively low mass, i.e., the metal portions are kept relatively thin, to minimize power requirements on the heater.

Figure 2:
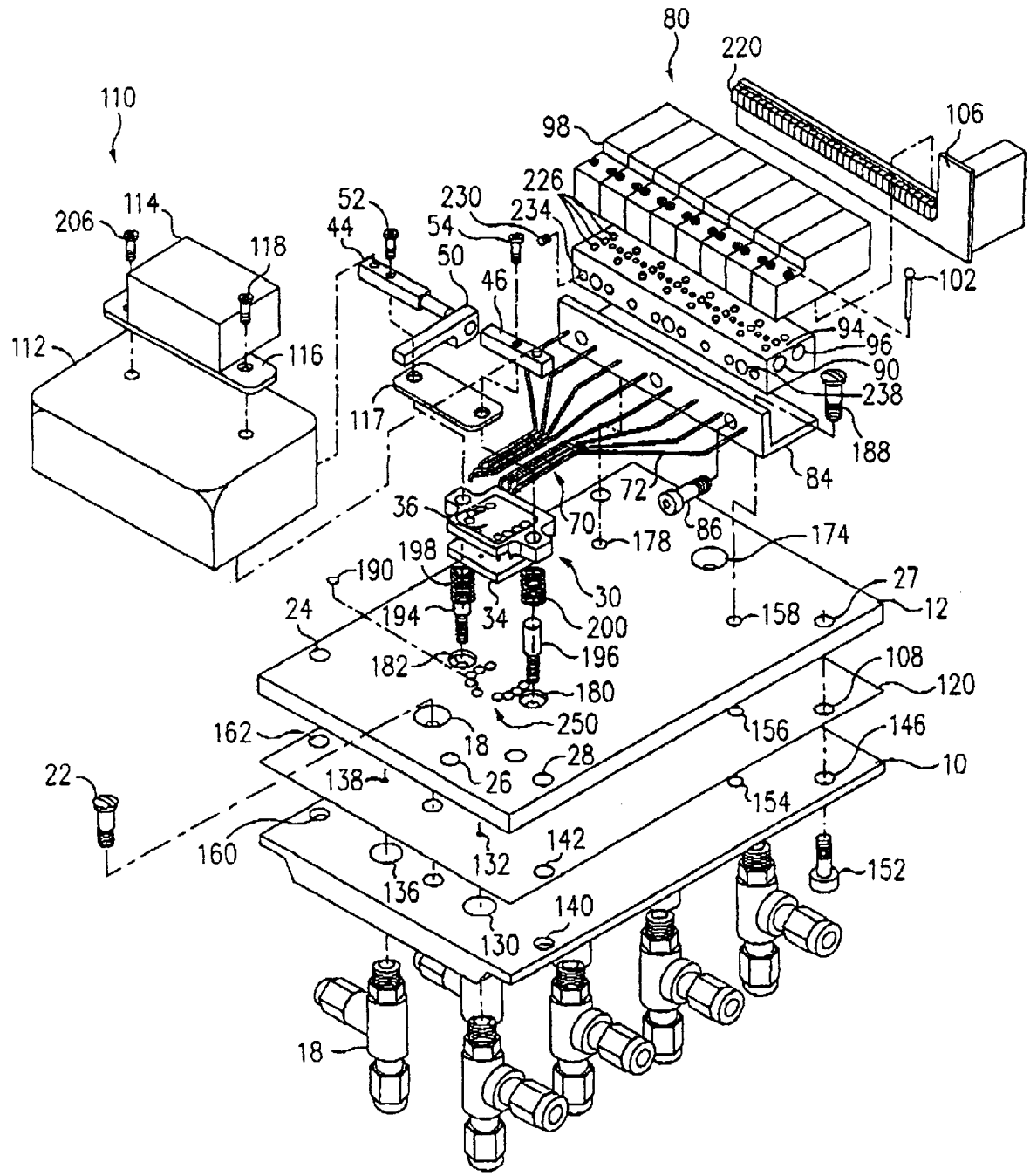
FIG. 2 shows the valve assembly of FIG. 1 in an exploded view.

FIG. 2 shows an exploded view of the structure of FIG. 1 with elements shown in FIG. 1 having identical reference numbers, and FIG. 2 shows additional elements. FIG. 2 also does not show, for simplicity, the heater pad which covers the upper surface of plate 12 except under valve assembly 30. Holes are cut through the heater pad to accommodate the various screws, fluid inlet sealing rings, and to expose sample outlet 26.

In the lower portion of FIG. 2, the polymer film 120 lies between the lower manifold plate 10 and the upper manifold plate 12 and bonds them together, when assembled, by heat pressure bonding. Polymer film 120 is e.g. a sheet of the material commercially available from Dupont called Kapton. Suitable holes, as shown in FIG. 2, are provided through film 120 for passage of fastening screws and the fluids.

As seen in FIG. 2, for instance fluid passage 130 in the lower manifold plate 10 communicates with one of the external fittings 18 and in turn communicates with a hole 132 in the polymer film 120 which in turn communicates with a passage (not shown) in the lower surface of the upper manifold plate 12 and which in turn communicates with a hole in the upper surface of the upper manifold plate 12, as described further below. Also provided through lower manifold plate 10 is another fluid passage 136 which communicates with fitting 18 and with a hole 138 in polymer film 120 which in turn communicates with a passage (not shown) in the upper manifold plate 12.

The upper manifold plate 12 and lower manifold plate with the intervening film 120 are additionally fastened together by screws, for instance screw 22 which penetrates through hole 186 and extends into the lower manifold plate 10. A number of such fastening screw may be provided. A second such screw (not shown) penetrates through hole 174. Also shown is hole 160 in the lower manifold plate 10, which coincides with hole 162 in the polymer film 120 which coincides with hole 24 in the upper manifold plate 12. This series of holes is for purposes of mounting the complete assembly, e.g. to a chassis. Similarly, holes 28, 142 and 140 are coaxial, as are holes 27, 148 and 146, accommodating screw 152 for mounting to a chassis.

The pilot valve assembly bracket 84 is fastened down to the upper manifold plate 12 by screws e.g. 188 as which extend into holes 158, 178 and through e.g. hole 156 and screws into hole 154.

Other elements associated with the upper manifold plate 12 are fastening holes 180 and 182 through which pass respectively pins 196 and 194. Springs 198 and 200 respectively fit over the upper (larger) ends of pins 194 and 196. Springs 198 and 200 in turn support the upper plate 36. It is to be understood, of course, that in one embodiment the valve assembly 30 is as described in the above-referenced patent application. Better seen in FIG. 2 is the silicon micromachined valve body 34. FIG. 2 better shows how the valve assembly cross arms 44, 46, cammed pivot lever 50, and the associated screws fit together and how pivot lever structure 50 pivots around the pin on the end of male cross arm 44 to allow lifting thereof against the spring force generated by springs 198, 200. This lifting allows the quick replacement of the micromachined valve body 34 in valve assembly 30 without use of tools, after the main cover 112 has been removed. Cover assembly 110 is a removable insulated cover including the main cover 112.

With reference to the pilot valve assembly 80, further detail is shown in FIG. 2, including the various fluid passages in the pilot valve manifold 94. Manifold 94 defines multiple passages 234 which communicate respectively with the tubes 70. The larger holes 238 in the facing side of the manifold 94 are attachment holes for screws 86 to penetrate therethrough and attach the manifold 94 to the manifold bracket 84. The holes e.g. 226 on the top surface of the manifold 94 communicate with each of the solenoid pilot valves 98. Small screws e.g. 102 fasten the various solenoid pilot valves 98 to the pilot valve manifold 94. Dual o-rings e.g. 230 seal each of tubes 70 to associated holes in pilot valve manifold 94.

Further detail of the PC board 106 is shown in FIG. 2, including the electrical contacts 220 to each of the pilot valves 98.

The fluid ports in the upper surface of upper manifold plate 12 are shown collectively at 250. Ports 250 each houses an o-ring 190 and communicates with a similar port in the lower surface of the valve body 34. The o-rings 190 seal the ports 250 to the corresponding ports in the lower surface of valve body 34. It is to be understood that each of ports 250 also communicates with a groove machined in the lower (not visible) surface of upper manifold plate 12, which in turn communicate with one of the fittings 18 via the corresponding holes formed in the polymer layer 120 and the lower manifold plate 10.

Figure 3A:
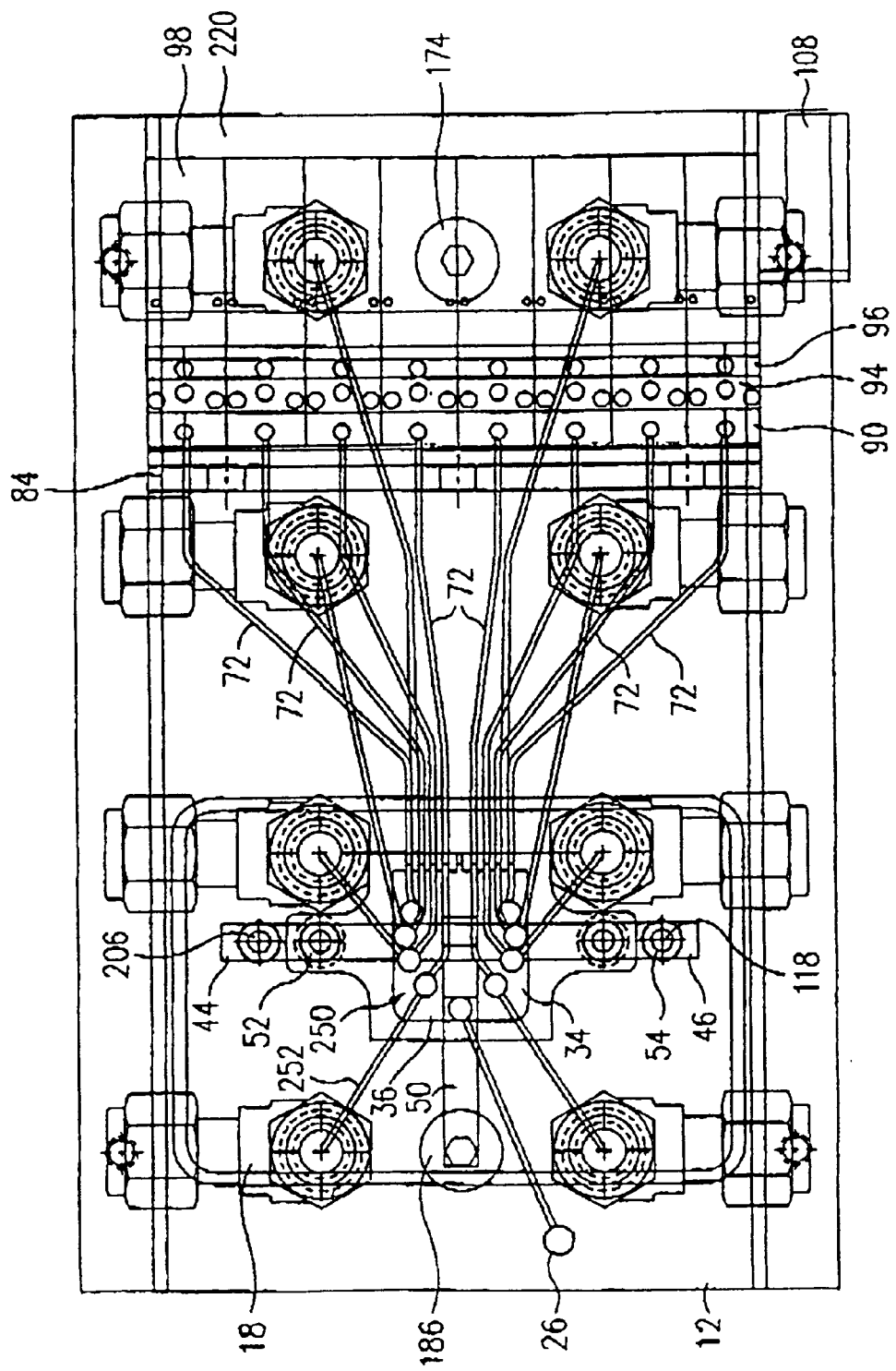
FIG. 3A shows an "x-ray" plan view for the valve port structure of the valve assembly of FIG. 1.

For purposes of better understanding, FIG. 3A shows an "x-ray" view (a plan view illustrating some but not all otherwise not visible structures) showing selected elements of FIGS. 1 and 2. FIG. 3A additionally shows the various passages e.g. 252 formed in the lower portion of the upper manifold plate 12 communicating with the associated ports 250 in the upper manifold plate 12 and with the fittings 18. In this case, each of the inlet fittings 18 provides fluid to silicon valve body 34 which in turn, by operation of the various pilot valves 98 determines which of these inlet ports 250 is in communication with the fluid outlet port 26. Hence valve body 34 acts as a selector valve, with several inlets and a single outlet for selecting a particular fluid stream or combination of fluid streams. This application is not limiting.

In this example, while eight inlet ports 250 are shown, this also is not limiting. Also, of course, the number of outlet ports 26 need not be as shown herein; there may be multiple output ports.

Also present in certain embodiments are filters located so as to filter out contaminates from the fluid streams being switched by the valve assembly 30. For instance, typically, a 0.2 to 5 micron contaminant size disk filter is located in the output port 26 and other such filters in each of the input fittings 18.

Figure 3B:
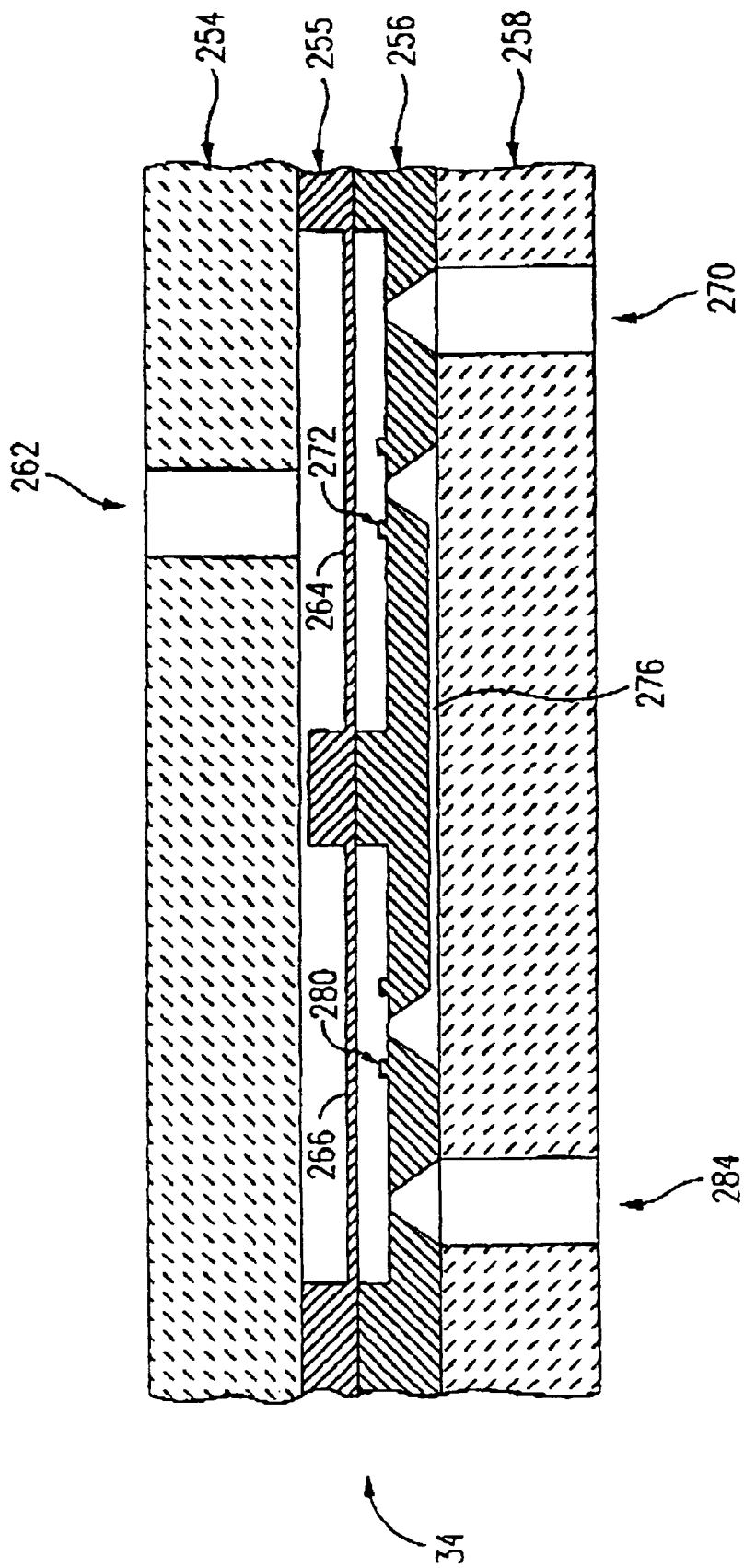
FIG. 3B shows a dual micro-valve structure in accordance with this invention.

FIG. 3B shows detail of a part of valve body 34 to illustrate the use of serially-connected dual micro-valves in accordance with the invention, as mentioned above. Conventionally each pilot valve actuates a single micro-valve on valve body 34. The present dual micro-valve structure provider redundancy in view of the above described fail open failure mode.

FIG. 3B shows in cross section one such set of dual micro-valves in valve body 34, which includes upper pyrex layer 254, diaphragm (silicon) layer 255, silicon valve seat layer 256, and lower pyrex layer 258. Inlet 262 is coupled to one of the pneumatic tubes 72 (not shown here) to apply pneumatic gas pressure to each of micro-valve diaphragms 264, 266. The actual fluid being valved enters at sample inlet 270, into the first micro-valve interior 272, and if diaphragm 264 is in the open position (as shown) flows through connecting passage 276 into the second microvalve interior 280. Both diaphragms 264, 266 are operated by the pneumatic pressure supplied at inlet 262. Thus in the valve open position the sample flows out through sample outlet 284. Application of pressure at inlet 262 pushes diaphragms 264, 266 down onto the respective valve seats (protrusions in layer 256) and closes both micro-valves.

While the present invention is disclosed in terms of a particular embodiment, this is not to be construed as limiting and further modifications will be apparent to one skilled in the art in light of this disclosure and are intended to fall within the scope of the appended claims.

What is claimed:

1. A selector valve assembly comprising:
    a substrate defining a plurality of input ports and at least one output port, each port communicating to a passage defined in the substrate;
    a first valve assembly having plurality of pneumatically operated micro-valves, all defined in a single micromachined valve body, wherein each micro-valve has at least one valve port, and the first valve assembly is mounted to the substrate, and each valve port in the first valve assembly communicates with a passage defined in the substrate; and
    a pilot valve assembly, including a plurality of valves each coupled to control one of the pneumatically operated microvalves of the first valve assembly.

2. The assembly of claim 1, further comprising a releasable clamp holding the first valve assembly to the substrate.

3. The assembly of claim 2, wherein the clamp is a spring-loaded cam.

4. The assembly of claim 1, where the first valve assembly is mounted to a first side of the substrate and the input ports and output ports in the substrate extend to a second opposing side of the substrate, and further comprising a tube fitting coupled to each of the input ports and the outlet port.

5. The assembly of claim 1, further comprising a heater element on a surface of the substrate.

6. The assembly of claim 5, wherein the heater element is a sheet heater.

7. The assembly of claim 1, wherein each of the pneumatically operated micro-valves has an associated second pneumatically operated micro-valve serially coupled to it and sharing a pilot valve.

8. The assembly of claim 1, further comprising a filter connected to each of the input ports.

9. The assembly of claim 1, wherein the substrate includes:
    a first plate, a second plate, and an intervening bonding layer, wherein the passages are defined in at least one of the plates and extend through the bonding layer.

10. The assembly of claim 9, wherein the first and second plates are of metal and the bonding layer includes a polymer material, wherein the bonding layer is bonded to each of the first and second plates.

11. The assembly of claim 9, wherein the bonding layer includes a polymer material bonded to each of the first and second plates.

12. The assembly of claim 1, wherein the first valve assembly includes a valve body in which the micro-valves are defined.

13. The assembly of claim 1, wherein each pilot valve is coupled to one of the pneumatically operated micro-valves by a tube.

14. The assembly of claim 1, wherein each pilot valve is solenoid operated.

* * * * *